United States Patent [19]

Hahn

[11] 4,113,893

[45] Sep. 12, 1978

[54] RADIATION CURE OF COATING COMPOSITIONS CONTAINING DIACRYLATE MONOMER AND HIDING PIGMENT

[75] Inventor: Ernest A. Hahn, Sewickley, Pa.

[73] Assignee: PPG Industries, Inc., Pittsburgh, Pa.

[21] Appl. No.: 778,210

[22] Filed: Mar. 16, 1977

Related U.S. Application Data

[63] Continuation-in-part of Ser. No. 592,308, Jul. 1, 1975, abandoned, which is a continuation-in-part of Ser. No. 261,479, Jun. 9, 1972, abandoned.

[51] Int. Cl.$^2$ .............................. C08F 2/46; C08F 4/00
[52] U.S. Cl. .................................. 427/44; 204/159.12; 204/159.15; 204/159.23; 204/159.24; 260/17 A; 428/54
[58] Field of Search ...................... 204/159.23, 159.24; 427/44, 54; 96/115 P

[56] References Cited

U.S. PATENT DOCUMENTS

| | | | |
|---|---|---|---|
| 3,619,392 | 11/1971 | Metzner et al. | 204/159.15 |
| 3,645,984 | 2/1972 | Dowbenko et al. | 260/78.4 |

*Primary Examiner*—Richard B. Turer
*Attorney, Agent, or Firm*—George D. Morris

[57] ABSTRACT

Coating compositions containing the oxygen sensitive diacrylate monomers 3-acrylyloxy-2,2-dimethylpropyl 3-acrylyloxy-2,2-dimethylpropionate, 1,3-bis(acrylyloxy)-2,2-dimethylpropane or mixtures thereof and further containing hiding pigment are cured by ionizing irradiation in the presence of a curing atmosphere containing from about 300 to about 1000 parts oxygen per million parts curing atmosphere. The resulting cured coating compositions are useful as protective coatings for many substrates.

16 Claims, No Drawings

RADIATION CURE OF COATING COMPOSITIONS CONTAINING DIACRYLATE MONOMER AND HIDING PIGMENT

CROSS-REFERENCE TO RELATED APPLICATION

This application is a continuation-in-part of application Ser. No. 592,308, filed July 1, 1975, now abandoned, which is a continuation-in-part of application Ser. No. 261,479, filed June 9, 1972, now abandoned.

BACKGROUND OF THE INVENTION

Acrylic resins have enjoyed extensive use as coating materials for many substrates in recent years. The acrylic resins are useful as they are capable of forming good hard films which are quite protective to the substrate on which they are used.

A problem involving the use of acrylic resin coatings has been the expense and time involved in curing the resins to a hard coating. The use of catalysts and heating in an oven is a slow and expensive process.

The use of ionizing irradiation as a fast and comparatively inexpensive method of curing selected compositions is now known. Coating compositions containing 3-acrylyloxy-2,2-dimethylpropyl 3-acrylyloxy-2,2-dimethylpropionate (viz., acryloxypivalyl acryloxypivalate), 1,3-bis(acrylyloxy)-2,2-dimethylpropane (viz., neopentyl glycol diacrylate) or mixtures thereof and further containing as hiding pigment titanium dioxide, zinc oxide, lithopone or mixtures thereof produce especially fine coatings when cured in a substantially inert curing atmosphere using ionizing irradiation. The curing of these coating compositions is quite sensitive to inhibition by oxygen. When coatings of these materials are exposed to ionizing irradiation while in contact with a curing atmosphere containing a cure inhibiting amount of oxygen (usually about 100 parts by volume oxygen per million parts by volume curing atmosphere or greater), the surfaces are observed to exhibit an unsatisfactory mar resistance. Exposure to even very large amounts of ionizing irradiation does not produce satisfactory surface mar resistance under these conditions.

The maintenance of oxygen concentrations as low as 100 parts per million is both difficult and expensive. Even small amounts of air entering the system through leaks or, more usually, by being entrained by the coated substrates passing through the curing apparatus, can easily raise the oxygen concentration above acceptable limits unless inordinate amounts of an inert gas such as nitrogen, carbon dioxide, argon, helium, methane, ethane or propane are used to purge the system. For example, in a system where ideal mixing can be assumed, it is necessary to purge with about 2100 volumes of pure inert gas per unit time for each volume of air per unit time entering the system in order to maintain an oxygen concentration of 100 parts per million parts, by volume. Should the volumetric flow rate of air be appreciable, the volumetric flow rate of gas passing through the apparatus is seen to be enormous. If the acceptable level of oxygen concentration of such a system can be raised to 300 parts per million, only about 700 volumes of pure inert gas per volume of air per unit time are required to maintain the oxygen concentration at 300 parts per million. If the acceptable level of oxygen concentration of the system can be raised to 1000 parts per million, the ratio of volumetric flow rates is reduced to about 209. If the inert gas contains oxygen, these ratios are even larger. Although ideal mixing is not strictly attainable in any real system, the assumption is useful in estimating, to a reasonable degree of accuracy, the approximate inert gas requirements of a real system.

It has now been discovered that triphenyl phosphine may be admixed with either or both of the diacrylate monomers and one or more of the hiding pigments hereinbefore described to form a composition which cures rapidly when subjected to ionizing irradiation in the presence of a curing atmosphere containing from about 300 to about 1000 parts per million oxygen. A hard film having a high degree of surface mar resistance is formed by exposing a coating of an ionizing irradiation curable coating composition comprising (1) diacrylate monomer which is 3-acrylyloxy-2,2-dimethylpropyl 3-acrylyloxy-2,2-dimethylpropionate, 1,3-bis(acrylyloxy)2,2-dimethylpropane or mixtures thereof, (2) hiding pigment which is titanium dioxide, zinc oxide, lithopone or mixtures thereof, and (3) from about 0.5 to about 10 percent triphenyl phosphine by weight of the composition while the surface of the coating opposite the substrate upon which it is coated is in contact with a curing atmosphere containing from about 300 to about 1000 parts oxygen by volume per million parts curing atmosphere by volume, to at least about 4 megarads of ionizing irradiation of an energy equivalent to at least 100,000 electron volts to cure the coating.

Although the preferred curing atmosphere contains only slightly greater than 300 parts per million of oxygen, the use of a greater amount of triphenyl phosphine allows the irradiation to take place in a curing atmosphere containing a greater amount of oxygen. Generally, the curing atmosphere contains from about 300 to about 500 parts oxygen by volume per million parts curing atmosphere by volume.

The compounds 3-acrylyloxy-2,2-dimethylpropyl 3-acrylyloxy-2,2-dimethylpropionate and 1,3-bis(acrylyloxy)-2,2-dimethylpropane and methods for their preparation are known to the art. Preparation of the former compound is described in Example 1 of U.S. Pat. No. 3,645,984. Preparation of the latter is shown in British Patent Specification No. 1,067,433.

It is noted that the compounds and mixtures of this invention may be mixed with other monomers and polymers. Examples of polymers which may be utilized along with the novel mixtures of this invention are acrylic polymers, vinyl polymers, and polyesters. Examples of other monomers which may be used along with the mixtures are acrylic monomers such as alkyl acrylates and methacrylates such as ethyl acrylate, butyl acrylate, 2-ethylhexylacrylate and methacrylate, lauryl acrylate and methacrylate and hydroxy alkyl acrylates and methacrylates such as hydroxyethyl acrylates and hydroxy methylmethacrylate and the like. Other materials may also be used to enhance the physical properties of the coating composition such as conventional pigments, plasticizers, etc.

The coating compositions may be prepared by simply admixing the various ingredients.

The diacrylate monomer described above generally constitutes from about 30 percent to 100 percent by weight of the binder of the coating composition. Typically, the diacrylate monomer is present in an amount in the range of from about 70 percent to 100 percent by weight of the binder.

Hiding pigment employed in the coating compositions of the invention is titanium dioxide, zinc oxide, lithopone or mixtures thereof. The hiding pigment to diacrylate monomer weight ratio of the coating compositions is usually in the range of from about 0.3:1 to about 3:1 where the diacrylate monomer is that heretofore described. Tinting pigments, extending pigments, other hiding pigments and/or dyes may, if desired, additionally be present. The preferred hiding pigment is titanium dioxide. The titanium dioxide may be rutile, anatase or mixtures thereof. Rutile is especially preferred.

The triphenyl phosphine may be admixed with the diacrylate monomer at any time prior to the ionizing irradiation treatment. The triphenyl phosphine is believed to act as an oxygen scavenger in the irradiation treatment. The triphenyl phosphine may be present in the amount of 0.5 to about 10 percent or greater by weight of the composition. With the addition of triphenyl phosphine, the irradiation can take place in an atmosphere containing 1000 parts per million of oxygen.

The term "irradiation," as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20 million electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include which has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Pat. No. 762,953 are satisfactory for the practice of this invention.

The diacrylate monomer combined with triphenyl phosphine will cure acceptably in the presence of 300 parts per million of oxygen or more using any total dosage greater than about 4 megarads. A "rad" is defined as that amount of radiation required to supply 100 ergs per gram of material being treated, and a "megarad" is $10^6$ rads. The total dosage is the total amount of irradiation received by the coating compositions. It is noted that the same compositions without the triphenyl phosphine could not be cured in the presence of a substantial amount of oxygen even at 100 megarads and higher to produce surfaces having satisfactory mar resistances.

The novel method of this invention may be used to coat substrates with the diacrylate monomer by merely applying the composition to the substrate and subjecting the composition to ionizing irradiation to cure in situ.

Any conventional means of applying the composition to the substrate may be used such as dip coating, roll coating, spraying and the like.

The coated substrates are quite useful for plywood paneling, cabinets, furniture, pringed paper products, cement, and cement asbestos products, and the like.

The following examples set forth specific embodiments of the invention. However, the invention is not to be construed as being limited to these embodiments for there are, of course, numerous possible variations and modifications. All parts and percentages of the examples as well as throughout the specification are by weight unless otherwise indicated.

EXAMPLE 1

A composition comprising 28.12 parts of a pigment mixture consisting of 97.98 percent $TiO_2$, 2.02 percent tinting pigment and 71.88 parts of a mixture containing 68.62 percent 3-acrylyloxy-2,2-dimethylpropyl 3-acrylyloxy-2,2-dimethylpivalate, 24.07 percent 1,3-bis-(acrylyloxy)-2,2-dimethylpropane, 6.35 percent ½ second cellulose acetate butyrate and 0.96 percent triphenyl phosphine was applied by a curtain coater to a primed hardboard surface and cured by subjecting to 5 megarads of electron beam irradiation in a nitrogen curing atmosphere containing 300 parts per million of oxygen. The resulting coated product was cured to a hard, mar-resistant, stain-resistant, abrasion-resistant material.

The above was compared to a primed hardboard surface coated with the same composition without triphenyl phosphine and subjected to 5 megarads in a curing atmosphere containing 300 parts per million of oxygen. The latter coated substrate was soft and had clearly unacceptable properties.

EXAMPLE 2

A composition comprising 32.78 parts of a pigment mixture consisting of 61.76 percent TiO$_2$ and 38.24 percent tinting pigments and 67.22 parts of a mixture consisting of 29.60 percent 3-acrylyloxy-2,2-dimethylpropyl 3-acrylyloxy-2,2-dimethylpropionate, 62.81 percent 1,3-bis(acrylyloxy)-2,2-dimethylpropane, 3.27 percent ½ second cellulose acetate butyrate and 4.32 percent triphenyl phosphine was coated onto a primed wood surface and subjected to 1 megarad of electron beam impingement in air and 5 megarads of electron beam impingement in a curing atmosphere containing 300 parts per million oxygen. The resulting coating had a hard, mar-resistant and stain-resistant surface.

EXAMPLE 3

Two test samples were prepared from the following materials:

|  | Sample A | Sample B |
|---|---|---|
| 1,3-bis(acrylyloxy)-2,2-dimethylpropane | 40 grams | 40 grams |
| 3-Acrylyloxy-2,2-dimethylpropyl 3-Acrylyloxy-2,2-dimethylpropionate | 20 grams | 20 grams |
| A solution of ½ second Cellulose Acetate Butyrate (15% by wt.) 3-Acrylyloxy-2,2-dimethylpropyl 3-Acrylyloxy-2,2-dimethylpropionate (85% by wt.) | 60 grams | 60 grams |
| A mixture of Titanium Dioxide (62.62% by wt.) 3-Acrylyloxy-2,2-dimethylpropyl 3-Acrylyloxy-2,2-dimethylpropionate (36.44% by wt.) ½ second Cellulose Acetate Butyrate (0.94% by wt.) | 116 grams | 116 grams |
| Triphenyl Phosphine | 4.7 grams | None |

Coatings of the test samples were individually applied to filled fiberboard panels so that the coatings were approximately 1¼ mils thick. The coated fiberboard panels were then exposed to an electron beam operating at 300 kilovolts, 22.5 milliamperes and a 5-inch by 48-inch scan pattern in curing atmospheres of various composition to cure the coatings and form test panels. The dose was 5 megarads. The curing atmospheres were formed from mixtures of oxygen and nitrogen and included curing atmospheres containing 300 and 1,000 parts per million oxygen.

To evaluate the test panels for stain resistance, the surfaces of 1 foot by 1 foot test panels were cleaned with ethyl alcohol and dried. Test reagents which included a paste of dry mustard, liquid shoe polish, Rit black dye and alcohol containing 1% iodine were applied to portions of the test panels and each treated portion was covered with a watch glass to prevent evaporation. After standing 16 hours at room temperature, the watch glasses were removed and the test panels were washed with water and then with a solvent mixture of 2 parts ethyl alcohol to 1 part VM&P Naphtha. One hour after cleaning, the test panels were examined for staining by placing them in a horizontal position at normal table height (approximately 30 inches) under overhead white fluorescent light and viewing them at an angle of approximately 90° to the surface. During this viewing, outside direct light such as sunshine was avoided as such light may accentuate or minimize the stain. Upon viewing, each treated portion of the test panels was assigned a Stain Rating on a scale of from 0 to 3, where 0 = no effect, 1 = light stain or slight appearance change, 2 = definite or heavy stain, 3 = maximum stain or film deterioration. The observed results are shown in the Table.

The test panels were next evaluated for abrasion resistance. To this end, 4 by 4-inch square test specimens were prepared from test panels and given rounded corners. Each test specimen was provided with a ¼-inch diameter hole in its center. Prior to testing each test specimen, a S-11 refacing disc was clamped onto the turntable of a Taber Abraser and the CS-17 abrasive wheels under a load of 1000 grams were applied thereto while the turntable was turned 25 revolutions (cycles) and while a vacuum system removed particles generated thereby. The refacing disc was then removed and replaced with a weighed test specimen. The CS-17 abrasive wheels under a load of 1000 grams were applied thereto for 25 cycle intervals until the test coating was first cut through (end point). At the end of each 25 cycles, the specimen was inspected for end point and after every 100 cycles, the test specimen is removed, wiped with a chamois and weighed. After every 500 cycles, the CS-17 abrasive wheels were refaced with a S-11 refacing disc by the procedure described above. Upon observation of the end point, the test specimen was removed, wiped with a chamois and weighed and the wear per 100 cycles determined as follows:

Milligrams Wear per 100 cycles =

$$\frac{\text{Milligrams Weight Loss at End Point}}{\text{Number of Cycles to End Point}} \times 100$$

The observed results are shown in the Table.

The test panels were evaluated for surface mar resistance. Test specimens 4 by 4-inch square were prepared from test panels while handling the surface of each test specimen as little as possible after the coating has been cured. The cured surfaces were not wiped with solvent or rubbed with a cloth. A nickel coin held between the thumb and forefinger was rubbed on the surface of the test specimen and the nickel-rubbed surface of each test specimen was observed and assigned a Surface Mar Resistance on a scale from 0 to 3 where 0 = no marking, 1 = slight mark but easily rubbed off with the fingers, 2 = substantial mark but still can be rubbed off with the fingers, 3 = very bad marking which cannot be rubbed off with the fingers. The observed results are shown in the Table.

The test panels were evaluated for surface finish (gloss) using a test apparatus and procedure in conformance with the ASTM "Tentative Method of Test for Specular Gloss", D-523-67 to measure the percent reflectance at 60°. The test apparatus was first calibrated on a working standard whose 60° gloss is close to that of the test specimen then gloss readings were taken of test specimens having a size at least 6 inches square with the test apparatus aligned along and across the machine direction. The observed results are shown in the Table which follows:

TABLE

| CURING ATMOSPHERE COMPOSITION, ppm O$_2$ | 300 | | 1000 | |
|---|---|---|---|---|
| SAMPLE | A | B | A | B |
| STAIN RESISTANCE | | | | |
| Iodine | 2-3 | 2 | 2-3 | 1 |
| Mustard | 0-1 | 0 | 0-1 | 0 |
| Shoe Polish | 1 | 1 | 1 | 1 |
| Rit Dye | 1-2 | 1-2 | 1 | 1 |

TABLE-continued

| CURING ATMOSPHERE COMPOSITION, ppm O$_2$ | 300 | | 1000 | |
|---|---|---|---|---|
| SAMPLE | A | B | A | B |
| ABRASION RESISTANCE, milligrams wear per 100 cycles | 8 | 6.5 | 6.9 | 7.0 |
| SURFACE MAR RESISTANCE | 1 | 3 | 2 | 3 |
| GLOSS, percent reflectance at 60° | 78 | 80 | 78 | 74 |

Although specific examples of the instant invention have been set forth hereinabove, it is not intended that the invention be limited solely thereto, but to include all the variations and modifications falling within the scope of the appended claims.

I claim:

1. A method comprising exposing a coating of an ionizing irradiation curable coating composition comprising:
    a. diacrylate monomer which is 3-acrylyloxy-2,2-dimethylpropyl 3-acrylyloxy-2,2-dimethylpropionate, 1,3-bis(acrylyloxy-2,2-dimethylpropane or mixtures thereof and which constitutes from about 30 percent to 100 percent by weight of the binder of said coating composition;
    b. hiding pigment which is titanium dioxide, zinc oxide, lithopone or mixtures thereof wherein the hiding pigment to diacrylate monomer weight ratio of said coating composition is in the range of from about 0.3:1 to about 3:1; and
    c. from about 0.5 to about 10 percent triphenyl phosphine by weight of said composition while the surface of said coating opposite the substrate upon which it is coated is in contact with a curing atmosphere containing from about 300 to about 1000 parts oxygen by volume per million parts curing atmosphere by volume, to at least about 4 megarads of ionizing irradiation of an energy equivalent to at least 100,000 electron volts to cure said coating to a hard film having a high degree of surface mar resistance.

2. The method of claim 1 wherein said ionizing irradiation is accelerated high energy electrons.

3. The method of claim 1 wherein said hiding pigment is titanium dioxide.

4. The method of claim 3 wherein said titanium dioxide is rutile.

5. The method of claim 1 wherein said curing atmosphere contains from about 300 to about 500 parts oxygen by volume per million parts curing atmosphere by volume.

6. The method of claim 1 wherein said diacrylate monomer is present in an amount in the range of from about 70 percent to 100 percent by weight of said binder.

7. A method comprising:
    a. applying to a substrate a coating of an ionizing irradiation curable coating composition comprising:
        (1) diacrylate monomer which is 3-acrylyloxy-2,2-dimethylpropyl 3-acrylyloxy-2,2-dimethylpropionate, 1,3-bis(acrylyloxy)-2,2-dimethylpropane or mixtures thereof and which constitutes from about 30 percent to 100 percent by weight of the binder of said coating composition,
        (2) hiding pigment which is titanium dioxide, zinc oxide, lithopone or mixtures thereof wherein the hiding pigment to diacrylate monomer weight ratio of said coating composition is in the range of from about 0.3:1 to about 3:1, and
        (3) from about 0.5 to about 10 percent triphenyl phosphine by weight of said composition; and
    b. while the surface of said coating opposite said substrate is in contact with a curing atmosphere containing from about 300 to about 1000 parts oxygen by volume per million parts curing atmosphere by volume, exposing said coating to at least about 4 megarads of ionizing irradiation of an energy equivalent to at least 100,000 electron volts to cure said coating to a hard film having a high degree of surface mar resistance.

8. The method of claim 7 wherein said ionizing irradiation is accelerated high energy electrons.

9. The method of claim 7 wherein said hiding pigment is titanium dioxide.

10. The method of claim 9 wherein said titanium dioxide is rutile.

11. The method of claim 7 wherein said curing atmosphere contains from about 300 to about 500 parts oxygen by volume per million parts curing atmosphere by volume.

12. The method of claim 7 wherein said diacrylate monomer is present in an amount in the range of from about 70 percent to 100 percent by weight of said binder.

13. A coating composition capable of being cured by exposure to ionizing radiation in contact with a curing atmosphere containing from about 300 to about 1,000 parts oxygen by volume per million parts curing atmosphere by volume, said coating composition comprising:
    a. diacrylate monomer which is 3-acrylyloxy-2,2-dimethylpropyl 3-acrylyloxy-2,2-dimethylpropionate, 1,3-bis(acrylyloxy)-2,2-dimethylpropane or mixtures thereof and which constitutes from about 30 percent to 100 percent by weight of the binder of said coating composition;
    b. hiding pigment which is titanium dioxide, zinc oxide, lithopone or mixtures thereof wherein the hiding pigment to diacrylate monomer weight ratio of said coating composition is in the range of from about 0.3:1 to about 3:1; and
    c. from about 0.5 to about 10 percent triphenyl phosphine by weight of said composition.

14. The coating composition of claim 13 wherein said hiding pigment is titanium dioxide.

15. The coating composition of claim 14 wherein said titanium dioxide is rutile.

16. The coating composition of claim 13 wherein said diacrylate monomer is present in an amount in the range of from about 70 percent to 100 percent by weight of said binder.

* * * * *